United States Patent [19]

Sato

[11] Patent Number: 4,835,531

[45] Date of Patent: May 30, 1989

[54] AUTOMOBILE REMOTE-CONTROL SYSTEM

[75] Inventor: Kazuo Sato, Iwanuma, Japan

[73] Assignee: Alps Electric Co. Ltd., Japan

[21] Appl. No.: 11,636

[22] Filed: Feb. 6, 1987

[30] Foreign Application Priority Data

May 16, 1986 [JP] Japan ................................ 61-112143

[51] Int. Cl.[4] ................................................ H04Q 7/00

[52] U.S. Cl. ...................... 340/825.690; 340/825.720; 340/825.630; 340/825.640

[58] Field of Search ...................... 340/825.31, 825.44, 340/825.69, 825.72, 825.54, 825.63, 825.64; 455/228, 343, 68

[56] References Cited

U.S. PATENT DOCUMENTS

| | | | |
|---|---|---|---|
| 3,611,156 | 10/1971 | Ward | 455/228 |
| 4,081,747 | 3/1978 | Meyerle | 455/68 |
| 4,142,177 | 2/1979 | Davis | 340/825.54 |
| 4,171,468 | 10/1979 | Reiner | 340/825.64 |
| 4,251,812 | 2/1981 | Okada et al. | 340/825.64 |
| 4,380,762 | 4/1983 | Capasso | 340/825.63 |
| 4,506,386 | 3/1985 | Ichikawa et al. | 340/825.44 |
| 4,511,887 | 4/1985 | Fiore | 340/539 |

FOREIGN PATENT DOCUMENTS

| | | | |
|---|---|---|---|
| 56-30392 | 3/1981 | Japan | 340/825.63 |
| 60-227547 | 11/1985 | Japan | 340/825.72 |
| 60-223288 | 11/1985 | Japan | 340/825.72 |

*Primary Examiner*—Donald J. Yusko
*Attorney, Agent, or Firm*—Guy W. Shoup; Paul J. Winters; Brian D. Ogonowsky

[57] ABSTRACT

An automobile remote-control system is disclosed. This system is characterized such that: a transmitter includes a carrier oscillating circuit for oscillating a carrier with a frequency higher than a radio broadcasting frequency band or a telephone transmitting-and-receiving frequency band; an operation voltage of this carrier oscillating circuit is turned ON/OFF by a drive control circuit; the carrier oscillating circuit is turned ON for a preset period prior to the transmission of the code thereby to transmit a leader pulse signal; the carrier oscillating circuit is subsequently turned ON in a pulse-like configuration at an interval corresponding to the code thereby to transmit a code pulse signal; a receiver receives the signal from the transmitter through a radio receiving antenna or a telephone transmitting-and-receiving antenna; the receiver is kept in an operation-state by a periodic operation control circuit at a cycle shorter than a continuance time of the leader pulse signal; when the leader pulse signal is detected by a detecting circuit, the receiver is held in the operation-state by an operation holding circuit; and the code pulse signal is converted into a code in accordance with a pulse interval by a code converting circuit.

4 Claims, 2 Drawing Sheets

AUTOMOBILE REMOTE-CONTROL SYSTEM

BACKGROUND OF THE INVENTION

1. Field of the Invention:

The present invention relates to an automobile remote-control system for remote-controlling a door and the like of an automobile.

2. Description of the Prior Art:

There has heretofore been employed an automobile remote-control system for effecting a locking-and-unlocking operation of a door of an automobile or its trunk room and a lighting-and-extinguishing operation of a room lamp thereof. This kind of remote-control system is arranged such that the operator carries a transmitter, while the automobile is loaded with a receiver. A carrier which is so frequency-modulated or amplitude-modulated in a modulating circuit as to correspond to a code is transmitted from the transmitter, and the thus transmitted carrier is received through the intermediary of an appropriate antenna by the receiver. Subsequently, an adequate actuator is operated in accordance with the code, thereby performing the remote-control operation.

The above-described prior art automobile remote-control system is, however, attended with problems wherein the appropriate antenna has to be prepared separately from another radio receiving antenna, which arrangement not only brings about uneconomicalness but also spoils the appearance because of a plurality of antennas being protruded from the body of automobile. In addition, there arises a problem in which a dangerous situation with respect to the outer circumference of the body of automobile is worsened. Since the carrier is transmitted after being modulated in accordance with the code, a carrier oscillating circuit for outputting the carrier is consecutively controlled in an operation-state during the transmission thereof, resulting in a problem in which a large amount of electric power is consumed and a life-span of a power source battery built in the transmitter resultingly becomes short. Furthermore, the transmitter requires the modulating circuit for modulating the carrier; and at the same time a configuration of the circuit becomes intricate, which is the very obstacle both against miniaturization of the transmitter and against reduction in weight thereof. It is uncertain to know when the carrier is transmitted from the transmitter; and the receiver which is on the stand-by remains in the operation-state for a long period of time, thereby consuming a great deal of electric power of the car battery for supplying the operation voltage to the receiver.

SUMMARY OF THE INVENTION

Accordingly, it is a primary object of the present invention which is made with a view to obviating the above-described problems incidental to a conventional automobile remote-control system to provide a novel automobile remote-control system wherein a radio receiving antenna serves as the antenna designed for the automobile remote-control system, and a transmitter and a receiver consume less electric power.

To this end, according to one aspect of the invention, in an automobile remote-control system wherein a present code is transmitted from the transmitter and is the received by the receiver equipped in the automobile; and an actuator is operated in accordance with the aforementioned code, there is provided a novel automobile remote-control system characterized such that the transmitter includes a carrier oscillating circuit for oscillating the carrier with a frequency that is higher than a radio broadcasting frequency band or a telephone transmitting-and-receiving frequency band; an operation voltage of this carrier oscillating circuit is tuned ON/OFF by means of a drive control circuit; the carrier oscillating circuit is, at the first onset, turned ON for a predetermined period of time prior to the transmission of the code thereby to transmit a leader pulse signal; the above-mentioned carrier oscillating circuit is subsequently turned ON in a pulse-like configuration at an interval corresponding to the foregoing code thereby to transmit a code pulse signal; the above-described receiver receives the signal transmitted from the transmitter through the intermediary of the radio receiving antenna or the telephone transmitting-and-receiving antenna installed in the automobile; the receiver is kept in an operation-state by a periodic operation control circuit for a short while at a cycle shorter than a continuance time of the above-mentioned leader pulse signal; when the leader pulse signal is detected by means of a detecting circuit during the operation of the receiver, the receiver is held in the operation-state by an operation holding circuit while receiving the code pulse signal; and the above-mentioned code pulse signal is converted into a code in accordance with the pulse interval by means of a code converting circuit.

Since the frequency of the carrier of the transmitter is made higher than the radio broadcasting frequency band or the telephone transmitting-and-receiving frequency band, it is feasible to separate the signal transmitted from the transmitter from the radio broadcasting signals or the like on account of the difference between the frequency bands thereof. The radio receiving antenna may serve as the receiving antenna for the automobile remote-control system. Furthermore, the operation voltage of the carrier oscillating cirucit is turned ON/OFF thereby to transmit the code pulse signal in the pulse-like configuration at the interval corresponding to the code. Hence, the operation time of the transmitter that goes on transmitting is short, and inevitably the electric power consumed is small. Moreover, the receiver is periodically kept in the operation-state for a short time, and immediately when detecting the signal from the transmitter, the operation-state is held for the predetermined period of time. Therefore, the operation time of the receiver that is on the stand-by is short, this leading to a decrease in cosumption of electric power.

These and other objects, features and advantages of the invention will become more apparent on reading the following detailed description in connection with the accompanying drawings.

Figure 1:
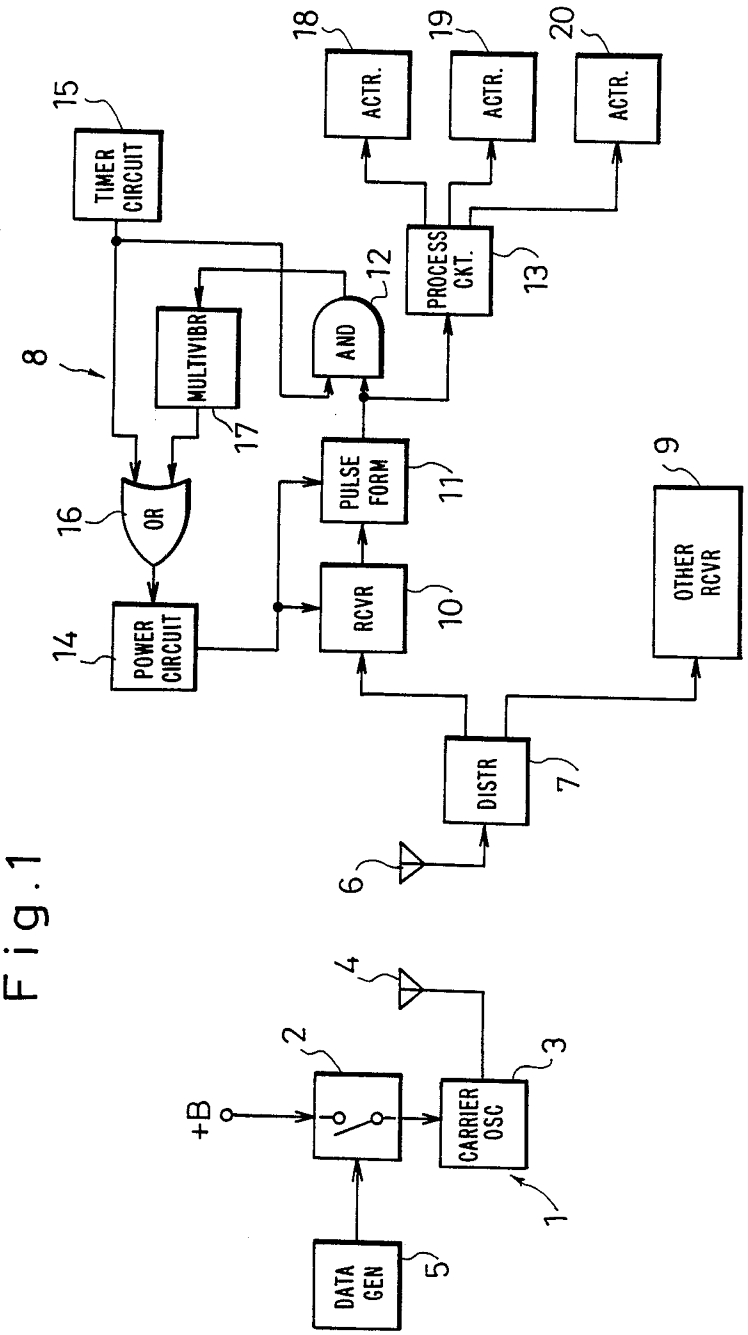
FIG. 1 is a block circuit diagram of an automobile remote-control system according to the present invention.
Figure 2A:
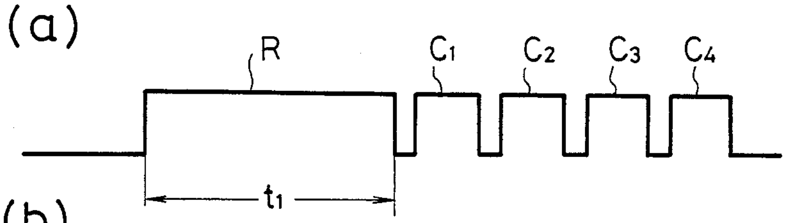
FIGS. 2(*a*), 2(*b*), 2(*c*) are time charts each showing an operation of the automobile remote-control system show in FIG. 1.
Figure 2B:
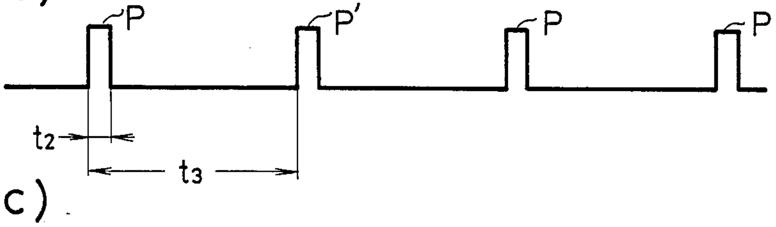
Figure 2C:
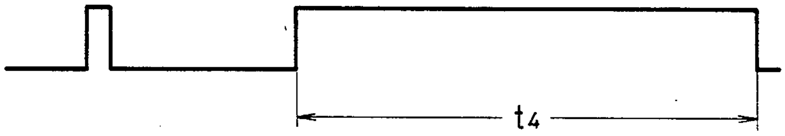
Figure 3A:
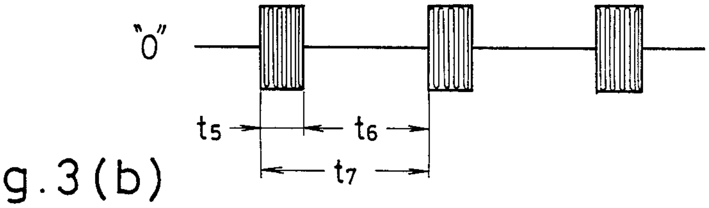
FIGS. 3(*a*), 3(*b*) are views each showing a constitution of a code pulse signal illustrated in FIG. 2.
Figure 3B:
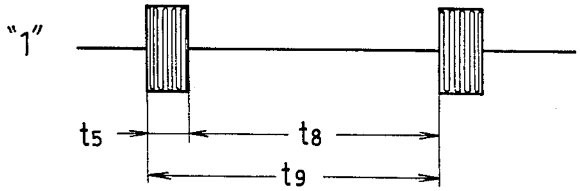

DETAILED DESCRIPTION OF THE PREFERRED EMBODIMENT:

An embodiment of the present invention will hereinafter be described with reference to FIGS. 1 to 3. FIG 1 is a block circuit diagram of an automobile remote-control system according to the present invention. FIGS. 2(*a*), 2(*b*), 2(*c*) are time charts which in combination show operations of the automobile remote-control system depicted in FIG. 1. FIGS. 3(*a*), 3(*b*) are views each showing a constitution of a code pulse signal of FIG. 2.

In FIGS. 1 to 3 inclusive, the situation of a transmitter 1 is such that an operation voltage outputted from a built-in power source battery (not illustrated) is supplied via a drive control circuit 2 composed by a semiconductor switch and other components to a carrier oscillating circuit 3. When the carrier oscillating circuit 3 is supplied with the operation voltage, a carrier having a frequency that is higher than a radio broadcasting frequency band or a telephone transmitting-and-receiving frequency band is oscillated, thereby transmitting it from a transmitting antenna 4. Upon shut-off of the operation voltage, the carrier ceases to oscillated. Thereafter, the drive control circuit 2 in which the operation voltage is turned ON/OFF is ON/OFF-controlled by the output of a data generating circuit 5.

Data to be transmitted are formed by combinations of codes of "0" and "1". The output from the data generating circuit 5 is turned ON at a timing t5 when the code is "0" and is then kept in an OFF-state for a period t6. An interval t7 ranges from an ON-state to the next one. When the code is "1", the output of the data generating cirucit 5 remains to be ON at the timing t5 and is then turned OFF for a period t8. Similarly, an interval t9 ranges from the ON-state to the next one. It is to be remarked that the period t6 differs from the period t8, and the interval t7 likewise differs from the interval t9. The drive control circuit 2 is ON/OFF-controlled by the output from the data generating circuit 5 invested with such characteristics. When the code is "0", pulse-like carriers are, as illustrated in FIG. 3(*a*), outputted from the carrier oscillating circuit 3 at the pulse intervals t7. When the code is "1", the same carriers are, as shown in FIG. (*b*), outputted at the intervals t9. The data are converted into combinations of the pulse-like carriers having the pulse interval t7 or the interval t9 corresponding to the codes of "0" and "1", thereby transmitting them as code pulse signals C1 to C4 depicted in FIG. 2(*a*) from the transmitter 1. The code pulse signals C1 to C4 are repeatedly transmitted with no variation in content, whereby the data contents are accurately transferred to the receiver. In advance of the code pulse signals C1 to C4, a leader pulse is outputted from the data generating circuit 5 with a relatively long continuance time t1. Hence, a leader pulse signal R which continues just for a long time t1 is, as shown in FIG. 2(*a*), transmitted from the carrier oscillating circuit 3; and subsequently the code pulse signals C1 to C4 are transmitted.

In the second place, the radio receiving antenna or the telephone transmitting-and-receiving antenna 6 of the automobile is provided with a distributor 7; and the carrier from the transmitter 1 is inputted to the receiver because of the frequency-difference. Thereupon, a radio broadcasting signal or a telephone transmitting-and-receiving signal is inputted to the radio receiver or the telephone transmitter-receiver 9. In this manner, the radio receiving anstenna or the telephone transmitting-and-receiving antenna 6 serves as the receiving antenna used for the automobile remote-control system.

The operation of the receiving is that the carrier transmitted from the transmitter 1 is tuning-selected in a receiving circuit 10 and is then transferred to a pulse forming circuit 11; and the outputs of this pulse forming circuit 11 are imparted both to one input terminal of an AND circuit 12 and to a data processing circuit 13. The receiving circuit 2 and the pulse forming circuit 11 are supplied with the operation voltages by a power source circuit 14. The receiver 8 is equipped with a timable circuit 15 wherein pulses P are, as illustrated in FIG. 2(*b*), periodically outputted with a short pulse with t2 at a cycle t3 shorther than the continuance time t1 of the leader pulse signal R. The pulses P are imparted both to the other input terminal of the AND circuit 12 and to one input terminal of an OR circuit 16. The outputs of the AND circuit are sent forth to a trigger input terminal of a multi-vibrator 17 which outputs an output pulse having a pulse width t4 which constinues for a perdetermined period enough to receive the code pulse signals C1 to C4. The output pulse of the multi-vibrator 17 is given to the other input terminal of the OR circuit 16. Supplying the receiving circuit 10 and the pulse forming circuit 11 with operation voltages of the power source circuit 14 is intermittently controlled by the output of the OR circuit 16.

In such a constitution, the pulses P are imparted from a timable circuit 15 via the OR circuit 16 to the power source circuit 14, and the operation voltages are supplied from the power source circuit 14 both to the receiving circuit 10 and to the pulse forming circuit 11 during only the period t2 for which the pulses P are outputted, whereby the receiver 8 is brought to the operation. While on the other hand, the receiver 8 is in the non-operation state during a period for which the pulses P are not outputted. Under such a stand-by condition, when the leader pulse signal R and the code pulse signals C1 to C4 are, as shown in FIG. 2(*a*), transmitted from the transmitter 1, the leader pulse signals R are received by the receiving circuit 10 which is brought into the operation-state by dint of pulses P′ outputted during the transmission of the leader pulse signals R, and the thus received leader pulse signals R are transmitted via the pulse forming circuit 11 to one input terminal of the AND circuit 12. At this time, inasmuch as the pulses P′ are imparted from the timable circuit 15 to the other input terminal of the AND circuit 12, and the AND circuit 12 generates the output thereby to trigger the multi-vibrator 17. Thereafter, the output pulses of the multi-vibrator 17 are sent via the OR circuit 16 to the power source circuit 14; and the power source circuits 14 continuously supplies the operation voltages to the receiving circuit 10 and the pulse forming circuit 11 during the preset period t4. The code pulse signals C1 to C4 are received by virtue of the consecutive operation of the receiver 8 and are then adequately processed by the data processing circuit 13.

The data processing circuit 13 subsumes a code converting circuit wherein conversion into the codes of "0" or "1" is effected in accordance with the pulse interval t7 or the interval t9 of the code pulse signals C1 to C4 which are transmitted to the data processing circuit 13; and the data in which these codes are combined are properly processed in the data processing circuit 13. The outputs of the data processing circuit 13 are sent forth to actuators 18, 19, 20 in accordance with the data, thereby locking and unlocking the door or the trunk room of the automobile.

In the embodiment relative to the receiver 8, the timable circuit 15 involves a periodic operation control circuit, the AND circuit 12 involves a detecting circuit, and the multi-vibrator 17 is defined as an operation holding circuit. These contitutions are not, however, limitative. Any structure is applicable, if the circuits have the same functions.

As can be clarified from the description thus far made, the automobile remote-control system according to the present invention yields the following favorable effects. Since the carrier of the transmitter is made higher than the radio broadcasting frequency band or the telephone transmitting-and-receiving frequency band, it is possible to separate the signal transmitted from the transmitter from the radio broadcasting signal or the like due to the difference between the freuencies thereof. The radio receiving antenna or the like may serve as the receiving antenna used for the automobile remote-control system according to the present invention and hence it is unnecessary to prepare an appropriate antenna. With this arrangement, the costs for producing the device are reduced as a whole, and the appearance of the automobile is not spoiled because of a small number of antennas being protruded therefrom. Furthermore, a dangerous situation attributed to the protrudent members can considerably be moderated. Inasmuch as the pulse-like carriers are transmitted at the pulse intervals according to the code while the operation voltage of the carrier oscillating circuit is turned ON/OFF, not only the operation time of the transmitter which is on the transmission is short, but also the device needs less consumption of electric power. Moreover, as in the case of this type of conventional device, the transmitter requires no modulating circuit, and constitutions of circuits are simple, which configuration facilitates a miniaturization of the transmitter and brings about a reduction in weight thereof. In addition, the receiver is periodically put into the operation-state for a short while, and the operation-state is held for a predetermined period of time immediately after detecting the signal from the transmitter. Hence, the operation time of the receiver which is on the stand-by is decreased, whereby a comparatively small amount of electric power is consumed and the battery loaded in the automobile is also small in cosumption of electric power.

What is claimed is:

1. In an automobile remote control system in which a preset code is transmitted from a remote transmitter, said code is received by a receiver installed in an automobile, and an actuator is operated in accordance with said code received by said receiver, the improvement comprising:

said transmitter being provided with a carrier oscillating circuit for oscillating a carrier with a predetermined frequency, a power source for supplying an operating voltage to said carrier oscillating circuit, and a data generating circuit for turning said operating voltage to said carrier oscillating circuit ON and OFF selectively to transmit a code signal composed of a leader pulse signal which is ON for a predetermined leader time period and, subsequently, a series of data pulse signals during a predetermined data time period representing said preset code, wherein said data pulse signals from said transmitter have a uniform pulse width and are spaced apart either by a first data time period to indicate a binary "1" or a different, second data time period to indicate a binary "0":

said receiver being connected to an antenna installed in the automobile to receive said code signal, and having a receiving circuit, an operating circuit for operating said receiving circuit to receive the data pulse signals of said code signal received by the antenna, and a processing circuit for processing the received data pulse signals into binary information in accordance with said first and second data time periods and providing an output to the actuator in accordance with said code represented by said binary information.

2. An automobile remote-control system according to claim 1, wherein said operating circuit includes a timable circuit for generating a series of timing pulses of a relatively short pulse width spaced apart by a predetermined cycle period which is shorter than the leader time period of said leader pulse signal of said code signal received from said transmitter, a power source circuit for providing an operating voltage to said receiving circuit in response to an enabling signal, and a detecting circuit for detecting synchronous receipt of both a timing pulse from said timable circuit and said leader pulse signal of said code signal and for providing in response thereto an enabling signal to said power source circuit for enabling it to provide the operating voltage to operate said receiving circuit continuously for a predetermined operating time period, wherein said operating time period is sufficiently longer than said data time period of said code signal to allow receipt of said data pulse signals representing the preset code, said receiver otherwise being kept in a non-operated standy condition.

3. An automobile remote-control system according to claim 1, wherein the antenna is used for an automobile radio or an automobile telephone installed in the automobile, the carrier frequency used by said carrier oscillating circuit of said transmitter is higher than the frequencies of the corresponding broadcasting bands of the automobile radio or telephone connected to the antenna, and said receiver includes a distributor for routing the higher frequency carrier signal from said transmitter to said receiver.

4. An automobile remote-control system according to claim 2, wherein said detecting circuit includes and AND circuit receiving an output from said receiving circuit and said timing pulse output of said timable circuit, a multi-vibrator for providing a continuing output for said predetermined operating time period in response to a high output from said AND circuit, and an OR circuit for providing an enabling output to said power source circuit in response to either the timing pulse output of said timable circuit or the continuing output of said multi-vibrator.

* * * * *